United States Patent
Yagi

(10) Patent No.: US 10,444,851 B2
(45) Date of Patent: Oct. 15, 2019

(54) CHARACTER INPUT METHOD, PROGRAM FOR CHARACTER INPUT, RECORDING MEDIUM, AND INFORMATION-PROCESSING DEVICE

(71) Applicant: OMRON Corporation, Kyoto (JP)

(72) Inventor: Hideki Yagi, Kanagawa (JP)

(73) Assignee: OMRON CORPORATION, Kyoto (JP)

( * ) Notice: Subject to any disclaimer, the term of this patent is extended or adjusted under 35 U.S.C. 154(b) by 151 days.

(21) Appl. No.: 15/509,698

(22) PCT Filed: Aug. 12, 2016

(86) PCT No.: PCT/JP2016/073713
§ 371 (c)(1),
(2) Date: Mar. 8, 2017

(87) PCT Pub. No.: WO2017/047304
PCT Pub. Date: Mar. 23, 2017

(65) Prior Publication Data
US 2017/0285761 A1    Oct. 5, 2017

(30) Foreign Application Priority Data
Sep. 15, 2015    (JP) .................. 2015-181580

(51) Int. Cl.
*G06F 3/01*       (2006.01)
*G06F 3/0488*     (2013.01)
(Continued)

(52) U.S. Cl.
CPC ............ *G06F 3/017* (2013.01); *G06F 3/0236* (2013.01); *G06F 3/042* (2013.01); *G06F 3/0482* (2013.01); *G06F 3/0488* (2013.01); *G06F 17/276* (2013.01)

(58) Field of Classification Search
CPC ........ G06F 3/017; G06F 3/0236; G06F 3/042; G06F 3/0482; G06F 3/0488; G06F 17/276
See application file for complete search history.

(56) References Cited

U.S. PATENT DOCUMENTS 6,307,541 B1 *  10/2001  Ho ............................. B41J 3/01
                                                              341/28
2007/0216659 A1  9/2007  Amineh
(Continued)

FOREIGN PATENT DOCUMENTS

JP    2000-268032 A    9/2000
JP    2002-203208 A    7/2002
(Continued)

OTHER PUBLICATIONS

English translation of JP2012084190A Author: Taro (Year: 2012).*
(Continued)

*Primary Examiner* — Mandrita Brahmachari
(74) *Attorney, Agent, or Firm* — Osha Liang LLP

(57) ABSTRACT

The layout of character keys each having a plurality of characters allocated thereto is established on a virtual surface (first layer) including a detection position of a gesture that satisfies predetermined conditions, and when a gesture moving along the first layer is detected, a selection position with respect to the layout of character keys is moved in accordance with the gesture movement. When the movement direction of the gesture is switched to a direction away from the first layer under the condition that a prescribed character key in the layout is selected, each character allocated to the character key being selected is arranged outside the first layer at individually different positions relative to a virtual axis passing through the character key. Thereafter, in response to detection of a gesture moving
(Continued)

toward any character, a character disposed at a moving destination is selected as an input character.

9 Claims, 13 Drawing Sheets

(51) Int. Cl.
*G06F 3/0482* (2013.01)
*G06F 3/023* (2006.01)
*G06F 3/042* (2006.01)
*G06F 17/27* (2006.01)

(56) References Cited

U.S. PATENT DOCUMENTS

| | | |
|---|---|---|
| 2008/0180403 A1 | 7/2008 | Park et al. |
| 2008/0278450 A1* | 11/2008 | Lashina .............. G06F 3/0488 345/173 |
| 2009/0128498 A1* | 5/2009 | Hollemans ............ G06F 3/041 345/173 |
| 2011/0302518 A1 | 12/2011 | Zhang |
| 2012/0120066 A1 | 5/2012 | Hirota |
| 2014/0108989 A1* | 4/2014 | Bi ..................... G06F 3/04886 715/773 |
| 2014/0157180 A1 | 6/2014 | Aono et al. |
| 2014/0223374 A1* | 8/2014 | Park ..................... G06F 3/017 715/825 |
| 2014/0267044 A1* | 9/2014 | Andersen ........... G06F 3/04886 345/168 |
| 2015/0130728 A1 | 5/2015 | Takenaka |
| 2017/0192671 A1* | 7/2017 | Osborne ............. G06F 3/0236 |

FOREIGN PATENT DOCUMENTS

| | | |
|---|---|---|
| JP | 2005-196530 A | 7/2005 |
| JP | 2010-097401 A | 4/2010 |
| JP | 2014-060640 A | 4/2014 |
| JP | 2014-082605 A | 5/2014 |
| JP | 2014-107848 A | 6/2014 |
| JP | 2014-191782 A | 10/2014 |
| JP | 2015-146082 A | 8/2015 |
| KR | 10-2009-0116591 A | 11/2009 |

OTHER PUBLICATIONS

International Search Report issued in PCT/JP2016/073713, dated Sep. 13, 2016 (5 pages).
Written Opinion of the International Searching Authority issued in PCT/JP2016/073713, dated Sep. 13, 2016 (4 pages).
New Mobile Era Realized by Gesture Interface—Space is stereoscopically captured with a compact, low-cost range image sensor, TERA, vol. 59, 2014, Public Relations Department, NTT Comware Corporation (https://www.nttcom.co.ip/tera/tera59/).
Extended Search Report issued in European Application No. 16843207.8, dated May 2, 2019 (10 pages).
Notice of Reasons for Refusal issued in Japanese Application No. 2015-181580, dated Aug. 13, 2019 (8 pages).

* cited by examiner

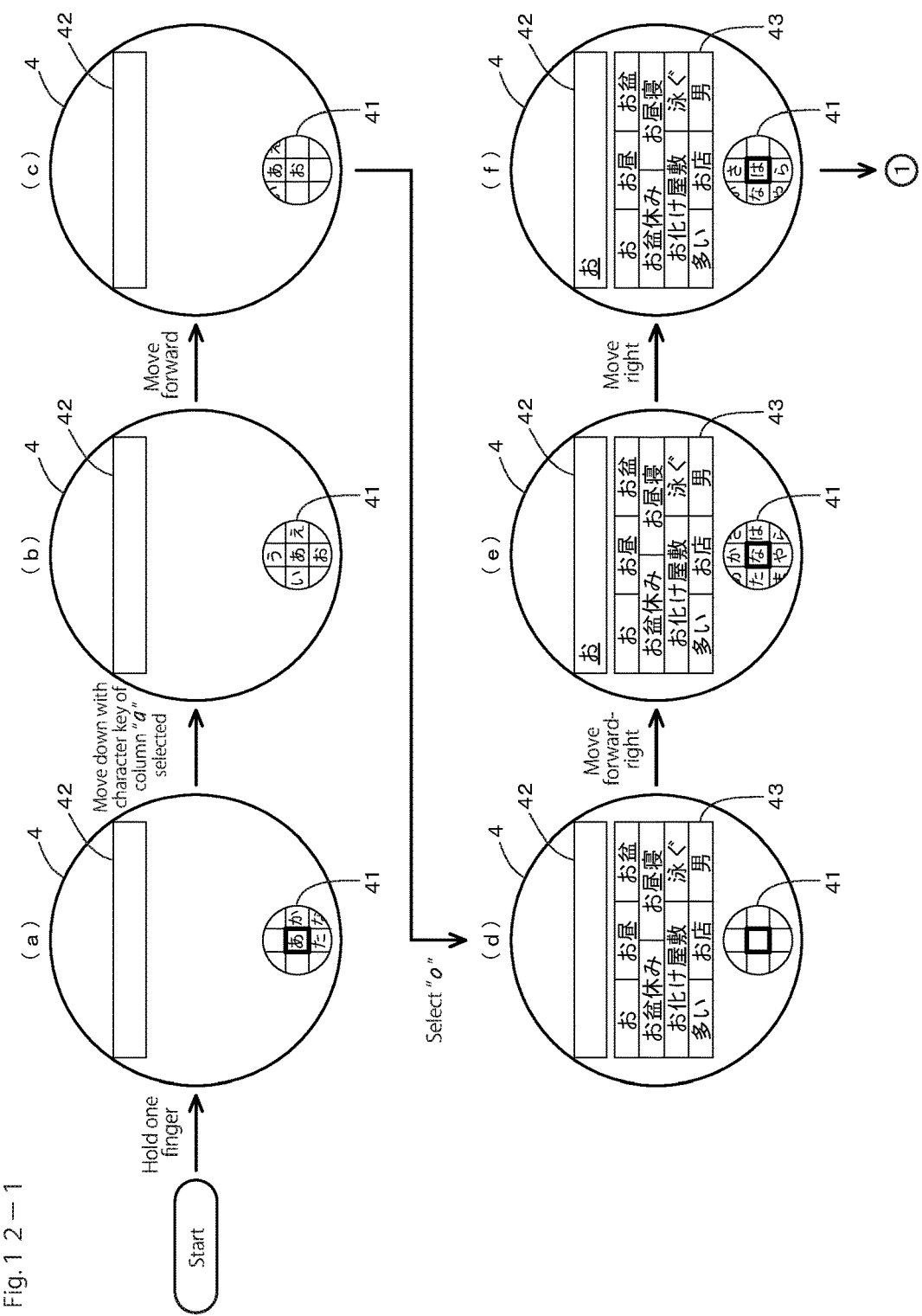

CHARACTER INPUT METHOD, PROGRAM FOR CHARACTER INPUT, RECORDING MEDIUM, AND INFORMATION-PROCESSING DEVICE

FIELD OF THE INVENTION

The present invention relates to a character input method for detecting a gesture as an operation for character input in response to a gesture of predetermined form performed in space, and determining a character to be input on the basis of the detection results; an information-processing device to which the method is applied; a program; and a recording medium.

BACKGROUND OF THE INVENTION

In recent years, a technique for detecting the movement in space of a user's finger or hand by means of a compact range image sensor, and recognizing patterns of the movement as operations for performing prescribed information processing, has been put to practical use (for example, see Non-patent Literature 1).

DESCRIPTION OF RELATED ART

Non-Patent Literature

Non-patent Literature 1: New Mobile Era Realized by Gesture Interface—Space is stereoscopically captured with a compact, low-cost range image sensor, TERA, vol. 59, 2014, Public Relations Department, NTT Comware Corporation (https://www.nttcom.co.jp/tera/tera59/)

SUMMARY OF THE INVENTION

The above-stated recognition technique is expected to be widely used in the near future, particularly in compact information-processing devices called "wearable terminals." Specifically, given the fact that it is difficult to apply, as is, user interfaces having the same operations as those currently used in smartphones to miniaturized touch panels, it is necessary to practically achieve techniques for character input by the performance of gestures in space.

It is more desirable for general users that a gesture interface employing character input operations that users are accustomed to performing on a touch panel is provided. However, if gestures corresponding to conventional tap operations and flick operations are accepted while the entire image of a virtual keyboard is displayed on a miniaturized screen, input errors can easily occur, or the character input efficiency may be reduced.

Further, when using a virtual keyboard having a configuration in which a plurality of characters is allocated to a single character key, such as a 12-key keyboard for Japanese character input, confusion is likely to arise when determining whether a gesture is for selecting a character key, or for selecting a character allocated to the character key selected. For example, when a user performs a gesture simulating a tap operation by continuing operation on the same key with the intention of changing characters, if the user's finger is positionally displaced in a longitudinal or horizontal direction while the finger is moving upward and downward, the positional displacement may be erroneously determined to be a switching operation for selection of adjoining character keys. Additionally, when a character is selected by a gesture simulating a flick operation from a character key, there can be, due to a change in finger height of a finger while the user moves the finger, an erroneous determination as to whether a tap operation or a switching operation for selection of a character key is performed.

One or more embodiments of the present invention make it possible to accurately recognize a character input operation by a gesture performed in space, thereby ensuring input operation for the correct characters.

One or more embodiments of the present invention are applied to a character input method for detecting a gesture of predetermined form as an operation for character input, by means of a gesture recognition device that recognizes a gesture performed in space; and determining a character to be input on the basis of the detection results in a computer that performs a prescribed process in response to character input. The gesture recognition device is composed of a sensor (range image sensor etc.) for measuring a three-dimensional shape of a part of a human body; a computer having software incorporated therein that processes the measurement results measured by the sensor to thereby recognize the pattern, the movement direction, and the movement distance of the gesture (a computer for implementing the character input method according to one or more embodiments of the present invention or a computer independent from the computer); etc.

In the character input method according to one or more embodiments of the present invention, the computer is configured to register first definition information for layout of a plurality of character keys on a virtual plane, each having a plurality of characters allocated thereto; and second definition information for layout of each character allocated to each of the arranged character keys outside the virtual plane at individually different positions relative to a virtual axis passing through the character key, after which the following steps 1 through 3 are performed.

In step 1, the plurality of character keys is arranged by applying the first definition information to a virtual plane including a detection position of a gesture, in response to detection of a gesture that satisfies predetermined conditions. In step 2, a selection position with respect to the layout of the character keys is moved in accordance with the gesture movement, under the condition that the gesture moving along the virtual plane on which the layout of the character keys is established is detected. In step 3, a character disposed at a moving destination of the gesture is selected as a character to be input in response to detection of a gesture moving toward any of the plurality of characters arranged on the basis of the second definition information with respect to the character key being selected after the movement direction of the gesture detected is switched from a direction along the virtual plane on which the character keys are established to a direction away from the virtual plane, under the condition that the prescribed character key in the layout is selected.

For example, given that character input is carried out by the movement of a hand with fingers formed in a specific shape, steps 1 and 2 are performed when a user starts to move the hand formed in the specific shape (for example, along a direction parallel to the plane on which a guidance screen for operation is displayed). While the user continues moving the hand along the virtual plane, the process of step 2 continues; therefore, selection with respect to the layout of character keys is switched in accordance with the movement direction and the movement distance per unit of time. When the hand that selected a target character key is moved in a direction away from the virtual plane on which the character keys are arranged (for example, downward from the virtual plane), the program proceeds from step 2 to step 3, in which the hand is moved in a direction toward any of characters arranged on the basis of the second definition information with respect to the selected character key, to thereby select the character as a character to be input.

As described above, according to one or more embodiments of the present invention, by switching the movement direction of a gesture from a direction along the virtual plane on which the character keys are arranged on a direction in which the gesture moves away from the virtual plane, the user can switch from a character key selection mode to a character selection mode, in which a character is selected from among characters allocated to the selected character key. Thereby, an operation for selection of a character is prevented from being erroneously determined to be an operation for switching selection to another character key, thereby allowing a user to precisely input an intended character.

In a first embodiment according to the present invention, second definition information is registered, implying that a plurality of characters allocated to the same character key is arranged on a second virtual plane that is along the virtual plane on which character keys are arranged. According to this second definition information, a virtual keyboard having a two-layered structure is established in space, in which the second virtual plane for each character key is linked to the virtual plane on which the character keys are arranged; therefore, character input can be accepted.

In a second embodiment according to the present invention, second definition information is registered, implying that with respect to layout of character keys, assuming a maximum of five characters allocated to each character key, such as in a 12-key keyboard for input of Japanese kana characters, each character of a plurality of characters allocated to the same character key, except for one character, is distributed in a range not including a position intersecting with the virtual axis on the second virtual plane along the virtual plane, while the one remaining character is disposed at the position intersecting with the virtual axis on a third virtual plane opposite the character keys, with the second virtual plane interposed between the virtual plane and the third virtual plane. According to this definition information, a virtual keyboard having a three-layered structure is established in space, in which the second and the third virtual planes for each character key are linked to the virtual plane on which the character keys are arranged; therefore, character input can be accepted. Further, five or fewer characters allocated to a character key can be arranged, employing the key layout in the virtual keyboard for a touch panel; therefore, it is possible to provide a gesture interface that is easily accepted by a user accustomed to touch-panel operation.

In a third embodiment according to the present invention, step 2 includes a process of displaying an image of a region that is a portion of an image showing the layout of the character keys, with a character key selected along a movement direction of the gesture as a center on the display connected to the computer. Further, step 3 includes a process of showing an image on the display, said image representing the positional relationship of each character allocated to the selected character key in place of the display in step 2, on the basis of the second definition information. These displays allow the user to correctly select input characters, while recognizing the character keys and characters selected by the gesture.

Further, in the third embodiment described above, in response to the selection of an input character in step 3, the computer can perform step 4 of extracting candidates for a character string to be input adapting to the input character and displaying a list of the extracted candidates on the display in response to selection of an input character in step 3, while performing step 5 of updating a display indicating a selection position in the list under a state in which the list is displayed, in accordance with a gesture movement in response to detection of a gesture having a form different from the above-described gesture, moving along the virtual plane on which the character keys are arranged. According to these steps, a character string composed of a plurality of characters can be efficiently input.

In a fourth embodiment according to the present invention, the gesture recognition device is configured to recognize a gesture including hand movement, and step 1 is performed in response to detection of a one-finger hand gesture on the basis of the recognition results by the gesture recognition device. Thereafter, step 2 is started with a position of any character key as an initial selection position in the layout of character keys established in step 1. Further, when it is detected that a one-finger hand starts to move in a direction along the virtual axis passing through a character key selected, the program proceeds from step 2 to step 3. According to this embodiment, a character key is selected by moving the one-finger hand gesture along the layout of character keys; thereafter, the direction of hand movement is switched to a direction along the axis passing through the selected character key, which allows a shift to a gesture for selection of characters.

In a fifth embodiment according to the present invention, the first definition information and the second definition information are registered in the computer for each of a plurality of types of virtual keyboards having different types of characters allocated to each character key. The virtual keyboard to be activated is switched in response to detection of a gesture having a prescribed form different from the gesture in relation to each of steps 1 through 3; accordingly, the computer performs each of steps 1 through 3 using the first definition information and the second definition information corresponding to the activated virtual keyboard. According to this embodiment, a plurality of types of characters can be input by gestures performed in space.

In a sixth embodiment according to the present invention, the display connected to the computer provides a display region, for input character string, equipped with a cursor indicating an input position. When an input character is selected in step 2, the input character selected is inserted ahead of the cursor in the display region for input character string. According to this embodiment, a plurality of input characters is selected in order by continuing gestures for selection of character keys and characters; therefore, input character strings formed by a series of these characters can be displayed in a display region for input character strings.

Further, in the sixth embodiment, to improve convenience, it is also possible to move a position of the cursor in response to detection of a first gesture having a form different from the gesture relating to each of steps 1 through 3; and to delete a character ahead of the cursor in response to detection of a second gesture having a form different from the gesture relating to each of steps 1 through 3 and the first gesture under a state in which an input character string having a prescribed length is displayed in the display region for input character string.

One or more embodiments of the present invention further provide a computer program that causes a computer in an information-processing device to function, and a non-temporary computer-readable recording medium that records the program. A character input device operated by this program includes: a definition information storage unit that stores the aforementioned first and second definition information; a character key layout establishing unit that establishes the layout of a plurality of character keys by application of the first definition information to a virtual plane, including a detection position of a gesture in response to detection of a gesture satisfying predetermined conditions; a character key selection unit that moves a selection position with respect to the layout of character keys in accordance with the movement of the gesture, under the condition that the gesture moving along the virtual plane on which the layout of character keys is established is detected; and an input character selection unit that selects a character disposed at a movement destination of the gesture as a character to be input in response to detection of a gesture moving toward any of the plurality of characters arranged on the basis of the second definition information with respect to the character key being selected after the movement direction of the gesture detected is switched from a direction along the virtual plane on which the character keys are established to a direction away from the virtual plane, under the condition that a prescribed character key in the layout is selected.

The above-described character input device may be provided with a display control unit that displays an image showing character keys or characters that can be selected by gestures being detected on the display provided in the information-processing device, in conjunction with the operation of the character key selection unit and the input character selection unit.

Additionally, the above-described character input device may be provided with a candidate extraction unit that extracts candidates for input character string adapting to an input character in response to selection of the input character by the input character selection unit. In this case, the display control unit is provided with a function of displaying a list of candidates extracted by the candidate extraction unit on the display while updating the selection position of the candidate in the list under a state in which the list is displayed, in accordance with a gesture movement in response to detection of a gesture that has a form different from the gesture in relation to the processing by the character key selection unit, and moves along the virtual plane on which the character keys are arranged.

Advantageous Effect of the Invention

According to one or more embodiments of the present invention, it is possible to correctly determine a gesture for selecting one of a plurality of character keys arranged on a virtual plane, and a gesture for selecting one of a plurality of characters allocated to the selected character key. Thereby, a gesture performed in space makes it possible to input a character efficiently and correctly.

BRIEF DESCRIPTION OF THE DRAWINGS

FIG. 9-1 is a flowchart illustrating steps of a main routine in the character input device.

FIG. 9-2 is a flowchart illustrating steps of a main routine in the character input device.

FIG. 10-1 is a flowchart illustrating the detailed steps of a character input acceptance process in a main routine.

FIG. 10-2 is a flowchart illustrating the detailed steps of a character input acceptance process in a main routine.

FIG. 12-1 is a view illustrating an example of a transition for a display screen created with the progression of processing following a user's gestures.

FIG. 12-2 is a view illustrating an example of a transition for a display screen created with the progression of processing following a user's gestures.

DESCRIPTION OF THE EMBODIMENTS

Figure 1:
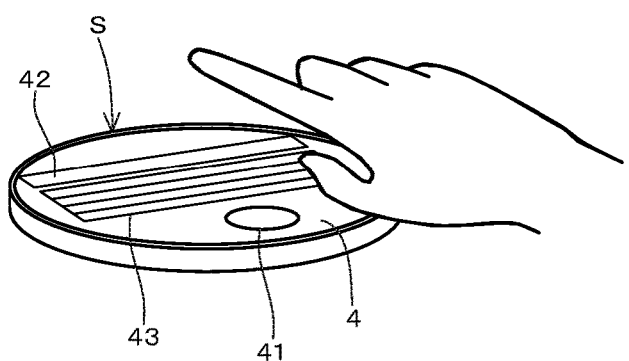
FIG. 1 is a view illustrating an example in which a gesture for character input is performed with respect to an information-processing device.

FIG. 1 is a view illustrating an example in which a gesture for input of a character is performed with respect to an information-processing device S (FIG. 1 shows only the main body thereof). The information-processing device S according to this embodiment is a wristwatch-type wearable terminal incorporating therein a circuit substrate on which a range image sensor, a microcomputer, etc., are mounted (not shown), having a display 4 constituted by a touch panel or the like provided on the front surface.

The range image sensor creates range image data reflecting the three-dimensional shape of a nearby object using infrared rays or lasers. The microcomputer includes a program for detecting a human finger from the range image data to thereby recognize the position and the shape thereof in space near the information-processing device. The function established in the information-processing device S on the basis of the program and the range image sensor is referred to as a "gesture recognition device," which is represented by reference numeral 2 in FIG. 2.

The microcomputer also includes a program for character input that causes the microcomputer to function as a character input device 1 that identifies several types of predetermined gestures from among gestures recognized by a gesture recognition device 2, and determines an input character on the basis of the gesture; and a program for an application 3 that performs a prescribed process using the determined input character. The above-described program for character input may be provided for the microcomputer through a non-temporary computer-readable recording medium such as a CD-ROM that records the program, or may be provided for the microcomputer through a communication line such as the internet etc.

Figure 2:
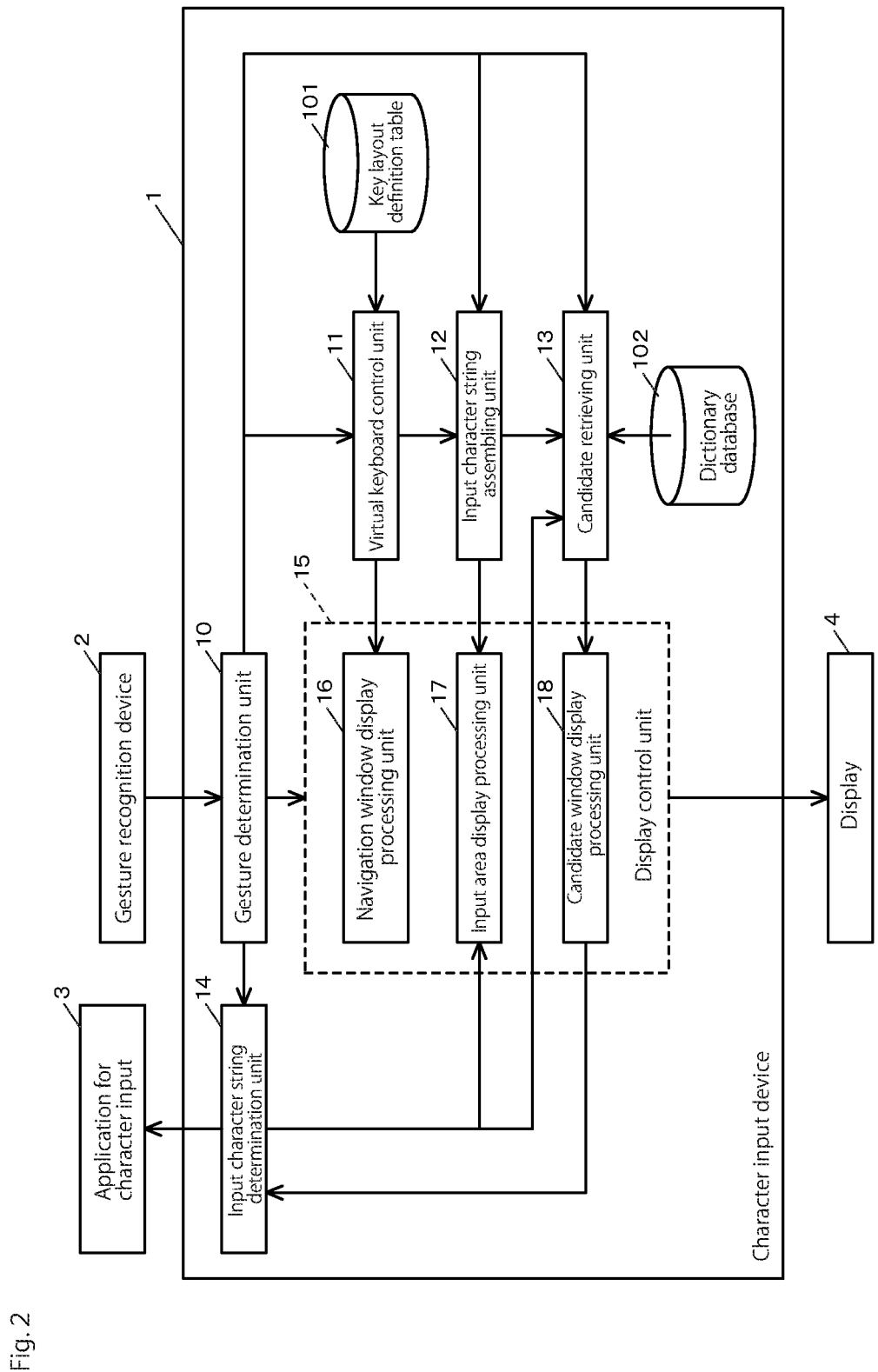
FIG. 2 is a block diagram illustrating functions of a character input device.

FIG. 2 illustrates functions included in the character input device 1 along with the relationship with the gesture recognition device 2, the application 3 to be input, and the display 4. The input device 1 according to this embodiment is provided with processing units such as a gesture determination unit 10, a virtual keyboard control unit 11, an input character string assembling unit 12, a candidate retrieving unit 13, an input character string determination unit 14, a display control unit 15, etc.; a key layout definition table 101; and a dictionary database 102 in which a plurality of types of words is registered.

The gesture determination unit 10 determines gestures for character input from among the recognition results created by the gesture recognition device 2, and performs processing in response to the gestures with the other processing units performing operations when receiving the recognition results.

When the gesture determination unit 10 detects a first gesture for character input, the virtual keyboard control unit 11 establishes a virtual keyboard having a three-layered structure (detailed later) at the position of the fingers for the gesture on the basis of the information registered in the key layout definition table 101. Further, the virtual keyboard control unit 11 switches the selection position with respect to the layout of character keys in response to gestures subsequently determined by the gesture determination unit 10, and selects any character allocated to the character key ultimately selected.

The input character string assembling unit 12 sequentially connects input characters selected by the virtual keyboard control unit 11 in series to thereby assemble an input character string. The input character string determination unit 14 determines an input character string when a gesture representing determination is performed, and outputs the determined character string to the application 3. The candidate retrieving unit 13 performs a search of the dictionary database 102 with the input character string assembled by the input character string assembling unit 12 to thereby extract a candidate for an ultimately formed input character string (hereinafter referred to as "estimated conversion candidate"), and performs a character-string extraction process for extracting a character string that can be input subsequent to the determined character string (hereinafter referred to as "connection candidate") by searching the dictionary database 102 with the character string determined by the input character string determination unit 14.

The display control unit 15 includes display processing units 16, 17, and 18 to display a navigation window 41, an input area 42, and a candidate window 43 on the display 4 (see FIG. 1). The navigation window 41 displays images for supporting character input operations. The input area 42 displays an input character string assembled by the input character string assembling unit 12 or an input character string determined by the input character string determination unit 14. The candidate window 43 displays lists of estimated conversion candidates and connection candidates extracted by the candidate retrieving unit 13.

Figure 3:
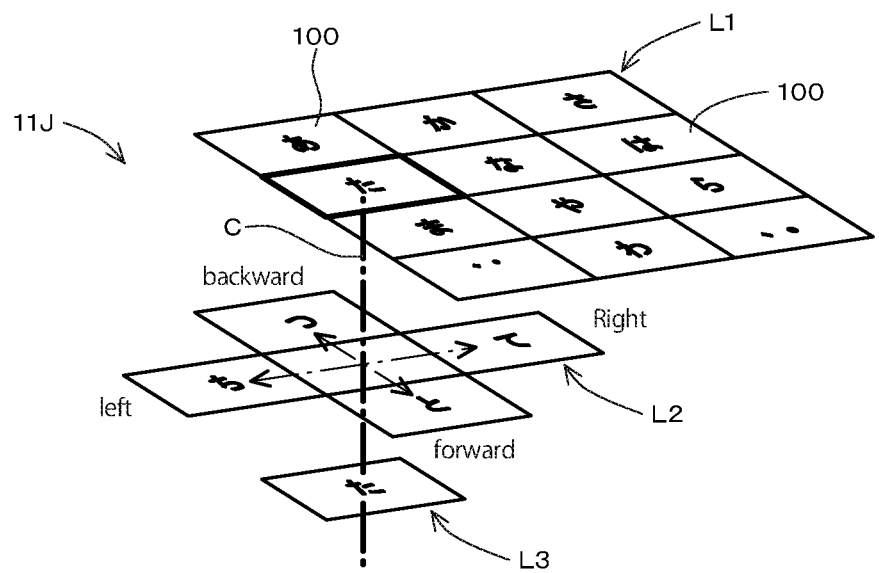
FIG. 3 is a view illustrating a configuration example of a virtual keyboard for input of Japanese characters.

FIG. 3 is a view illustrating a configuration example of a virtual keyboard 11J for Japanese kana character input registered in the key layout definition table 101. The virtual keyboard 11J has a three-layered structure employing the 12-key keyboard that has been adopted in the user interface of conventional smartphones. Specifically, 12 character keys 100 are arranged on the top layer (hereinafter referred to as "first layer L1"); kana characters are allocated to 10 character keys 100 of these character keys; and symbols or the like are allocated to the two remaining character keys 100. In the allocation of kana characters, 5 or 3 kana characters having a common consonant are allocated to the same character key 100 on the basis of the 50-sound table. Each character key 100 bears kana characters "a" "ka" "sa" "ta" "na" . . . "wa" (hereinafter referred to as "representative characters") having a vowel "a" contained in the kana characters allocated.

A second layer (hereinafter referred to as "second layer L2") and a third layer (hereinafter referred to as "third layer L3") are independently provided for each character key 100, and arranged parallel to the first layer L1 with a virtual axis C passing through a corresponding character key 100 as the center. A plurality of characters (four or fewer) excluding the representative character of the characters allocated to the corresponding character key is arranged on the second layer L2, and only the representative character is arranged on the third layer L3. Although the virtual keyboard 11J for kana input according to this embodiment is intended to input hiragana characters, a virtual keyboard having the same three-layered structure can be applied to katakana input.

According to this embodiment, a character input operation is performed by a gesture made by moving one finger held in space over the display 4 of the information-processing device S (see FIG. 1), when each layer L1, L2, and L3 is arranged along a virtual plane parallel to the surface of the display 4. Hereinafter, a direction along the horizontal axis of the layout of the character keys 100 (a direction in which character keys 100 of each column are aligned in the following order: "a" "ka" "sa") is defined as a horizontal direction; a direction along the vertical axis (a direction in which character keys 100 of each column are aligned in the following order: "a," "ta," "ma") is defined as a longitudinal direction; and the four directions of the character keys 100 are expressed as "forward," "backward," "left," and "right."

In the second layer L2, characters containing a vowel "i" are disposed at positions offset to the left of the corresponding character key 100 of the first layer L1; characters containing a vowel "u" are disposed at positions offset to the rear side; characters containing a vowel "e" are disposed at positions offset to the right side; and characters containing a vowel "o" are disposed at positions offset to the front side. In the third layer L3, representative characters containing a vowel "a" are disposed at positions opposite the character keys 100 in the first layer L1 (intersecting positions with the virtual axis C), with the second layer L2 interposed between the third layer L3 and the first layer L1. Therefore, when the second layer L2 and the third layer L3 are seen through the first layer L1, each character is disposed having the same positional relationship as the character layout for a flick operation in the virtual keyboard for a touch panel.

The actual surface of the display 4 is likely to be inclined in an arbitrary direction; therefore, the direction of each layer L1, L2, and L3 changes depending on the degree of the inclination. Further, the finger for performing a gesture is not necessarily opposite the display 4, and may be placed outside the range opposite the display 4 as long as the finger is in a range the range image sensor can detect. Similarly, a gesture can be performed at any height.

According to this embodiment, the operation with respect to the above-described virtual keyboard 11J includes a one-finger hand gesture movement in a direction substantially parallel to the surface of the display 4 (hereinafter this gesture is referred to as "parallel movement"), and a one-finger hand gesture movement toward the display 4 and a gesture moving away from the display 4 (hereinafter, the former gesture is referred to as a "downward-movement action" and the latter gesture is referred to as an "upward-movement action"). The gesture determination unit 10 tracks the position of the feature point group at the tip of the one finger on the basis of the recognition results created by the gesture recognition device 2 and calculates the movement direction and the movement distance, thereby determining, from among parallel movement, downward-movement action, and upward-movement action, the action that is currently performed.

When starting detection of a one-finger hand, the virtual keyboard control unit 11 establishes the first layer L1 at the position of the finger of the hand, and sets up a state in which a prescribed character key 100 in the first layer L1 (for example, a character key 100 of the column "a") is selected. Thereafter, when parallel movement is detected, the virtual keyboard control unit 11 regards this parallel movement as a movement in the first layer L1, and switches the selection position with respect to the layout of the character keys 100 by following this movement.

When a downward-movement, one-finger hand action is detected under a state in which any character key 100 (for example, a character key 100 of the column "ta" in FIG. 3) is selected, the virtual keyboard control unit 11 activates the second layer L2 and the third layer L3 corresponding to the selected character key 100. Thereafter, when a parallel movement is again detected, the parallel movement is determined to be a movement in the second layer L2. Then, a character corresponding to the movement direction is selected as an input character from among characters (for example, "chi," "tsu," "te," "to") arranged on the second layer L2, corresponding to a movement directed toward any one of "forward," "backward," "left," and "right." Meanwhile, when a movement distance due to the downward-movement action exceeds a prescribed threshold without detection of a parallel movement, it is determined by the downward-movement action that the finger moves to the third layer L3, and a representative character disposed on the third layer L3 (for example, "ta") is selected as an input character.

When an upward-movement, one-finger hand action is detected under a state in which the movement distance of the downward-movement action remains under a threshold without detection of parallel movement, the upward-movement action is determined to be a return action to the first layer L1. Thereafter, if a parallel one-finger hand movement is detected again after the upward-movement action is finished, the process of switching selection of the character key 100 in the first layer L1 is resumed by following the parallel movement. Further, in the case where the one-finger hand is held after a character in the second layer L2 or in the third layer L3 is selected, the process responding to the gesture for character input is subsequently carried out by returning to the state in which a character key 100 in the first layer L1 is selected.

As described above, according to this embodiment, when the one-finger hand action is switched from a parallel movement to a downward-movement action, a mode for accepting selection with respect to the first layer L1 on which the character keys 100 are arranged is switched to a mode for accepting selection of any character allocated to the selected character key 100. Thereby, a gesture for selection of a character after selection of a character key 100 is prevented from being determined as an operation for switching selection to another character key, thereby allowing a user to determine an intended character as an input character.

Further, after performing an action of moving a finger to a target character key 100 and pushing the character key 100 lightly (downward-movement action), the user can select an input character by making the same finger movement as that of a smartphone flick operation. Therefore, the user can carry out character input by performing a gesture already familiar to a user accustomed to smartphone operation.

A navigation window display processing unit 16 displays the navigation window 41 on the display 4, the navigation window 41 including images showing patterns of the layout of selected character keys 100 and characters allocated to the selected character key 100 on the basis of gestures per unit time while the one-finger hand gesture that is performed is detected (see FIG. 12 detailed later). By following this display, the user can perform the above-described gestures while recognizing the selected character keys 100 and characters.

Figure 4:
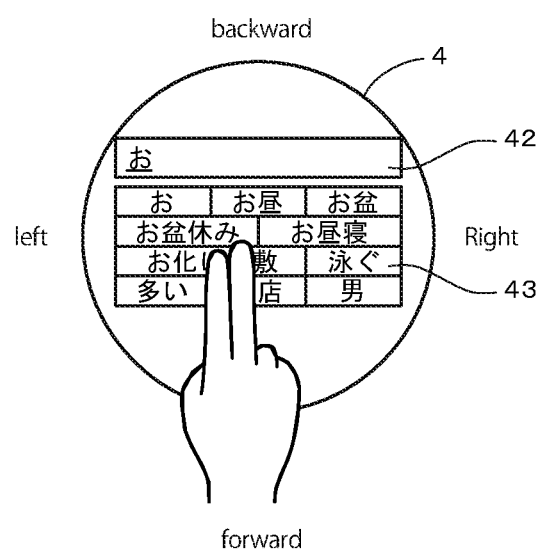
FIG. 4 is a view illustrating an example of a gesture for selection with respect to a candidate list.

Operations except for the operation with respect to the virtual keyboard 11J may be performed by gestures performed in space based on a prescribed rule. FIG. 4 shows a state in which a gesture for selection of a candidate is being performed with respect to a display in the candidate window 43 including a list of estimated conversion candidates or connection candidates. In this embodiment, a two-finger hand gesture moving over the candidate window 43 in a longitudinal direction or a horizontal direction is established as an operation for switching selection of a candidate, and a candidate being selected is switched in accordance with the movement direction and movement distance of the fingers.

Figure 5:
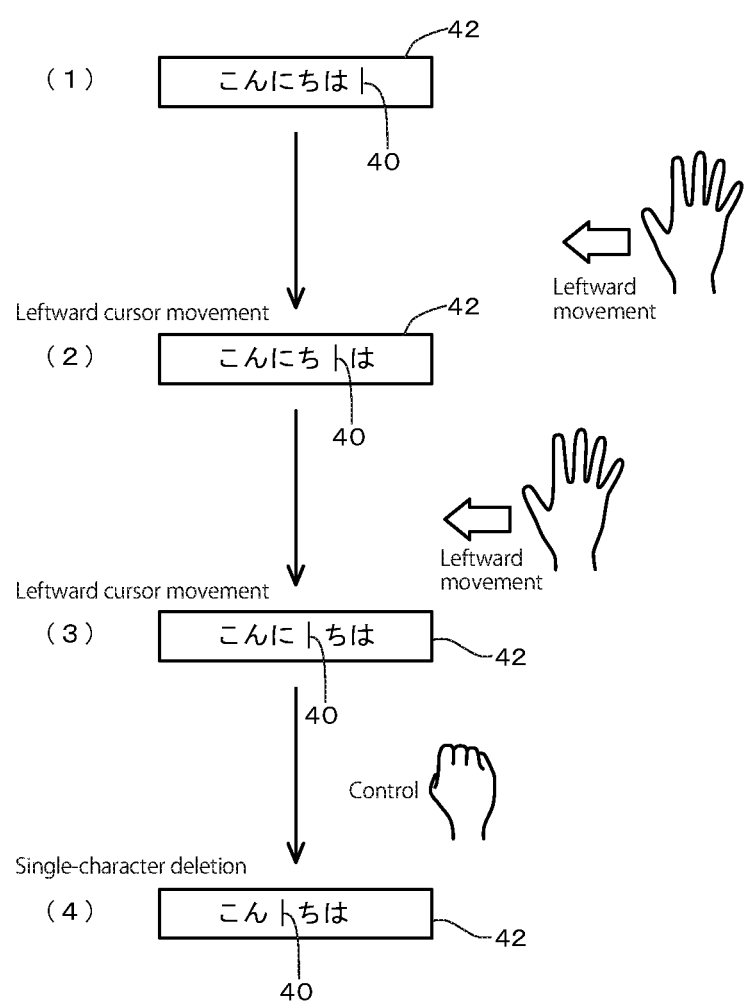
FIG. 5 is a view illustrating an example of a gesture for directing movement of a cursor and deletion of an input character in an input area.

FIG. 5 shows gestures with respect to the input area 42, and specific examples of the process performed by such gestures. In this embodiment, the position of a cursor 40 is moved in the input area 42 by holding a five-finger hand gesture made over the input area 42 wherein an input character string having a prescribed length is displayed, and moving the hand along the input character string (see FIG. 5(1), (2), (3)). Further, as shown in FIG. 5(4), closing the five-finger hand gesture into a fist is established as an operation that directs deletion of an input character, and a character ahead of the cursor 40 in the input area 42 is deleted in response to the action. Further, if the hand closed into a fist is held for a prescribed period of time, characters ahead of the cursor 40 are deleted sequentially, one by one.

Figure 6:
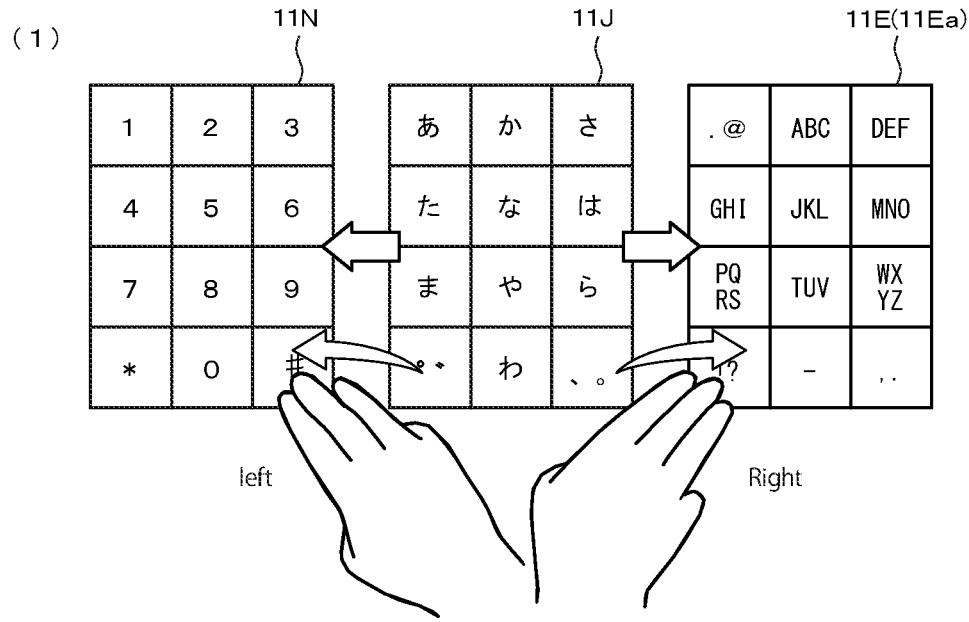
FIG. 6 is a view illustrating an example of a gesture for switching a type of virtual keyboard.
Figure 6:
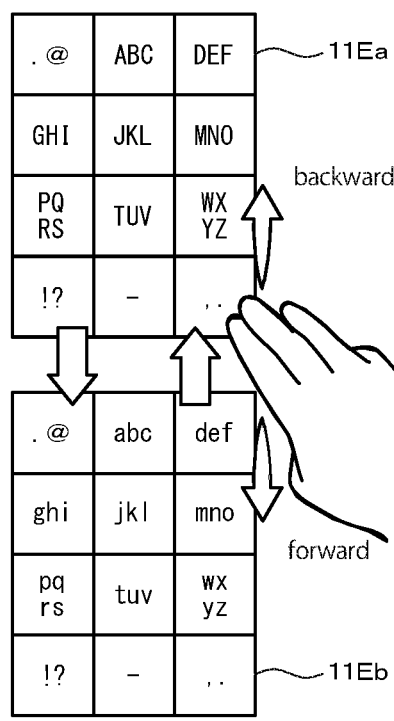
Figure 7:
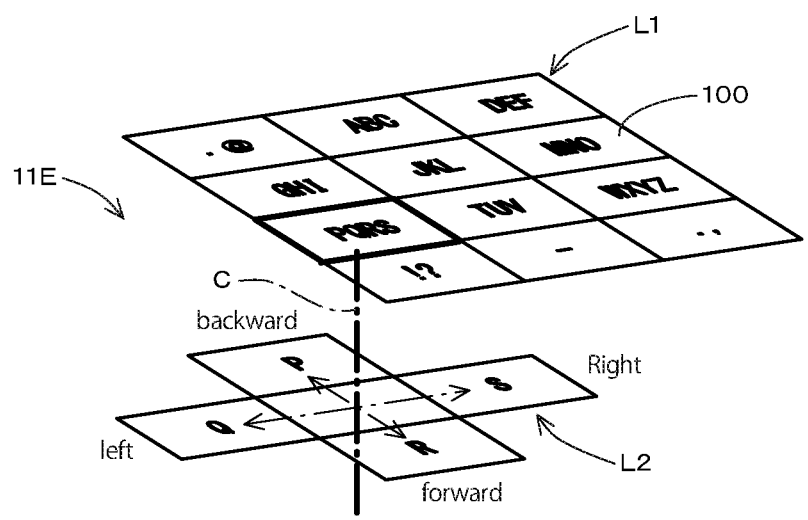
FIG. 7 is a view illustrating a configuration example of a virtual keyboard for input of English characters.

The key layout definition table 101 shown in FIG. 2 stores the definition information of a virtual keyboard 11E for English character input and a virtual keyboard 11N for numeral input, as shown in FIG. 6(1), in addition to the definition information exhibiting the configuration of the virtual keyboard 11J for kana character input shown in FIG. 3. Further, in relation to the virtual keyboard 11E for English character input, the key layout definition table 101 stores the definition information for two types of virtual keyboards 11Ea and 11Eb, as shown in FIG. 6(2).

In this embodiment, a three-finger hand gesture waving in a horizontal direction (swiping) is established as an operation for directing switchover between three types of virtual keyboards 11J, 11N, and 11E (see FIG. 6(1)). Further, in relation to the virtual keyboard 11E for English character input, a three-finger hand gesture waving in a longitudinal direction is established as an operation for directing switchover between a virtual keyboard 11Ea for uppercase character input and a virtual keyboard 11Eb for lowercase character input (see FIG. 6(2)).

Furthermore, in relation to the virtual keyboards 11J, 11E, and 11N for Japanese character input, English character input, and numeral input, respectively, an input mode for full-width characters and an input mode for half-width characters can be switched between by a gesture of prescribed form.

Further, the virtual keyboard 11E for English character input has only four characters or fewer allocated to each character key 100, and is thus configured to have a two-layered structure made up of a first layer L1 on which the character keys 100 are arranged and a second layer L2 for each character key. In the second layer L2 corresponding to each character key 100, characters are arranged at positions displaced longitudinally and horizontally with respect to the corresponding character key 100.

The virtual keyboard 11N for numeral input has one character allocated to each character key 100, and is thus configured to have a single-layered structure made up of only the first layer L1.

Figure 8:
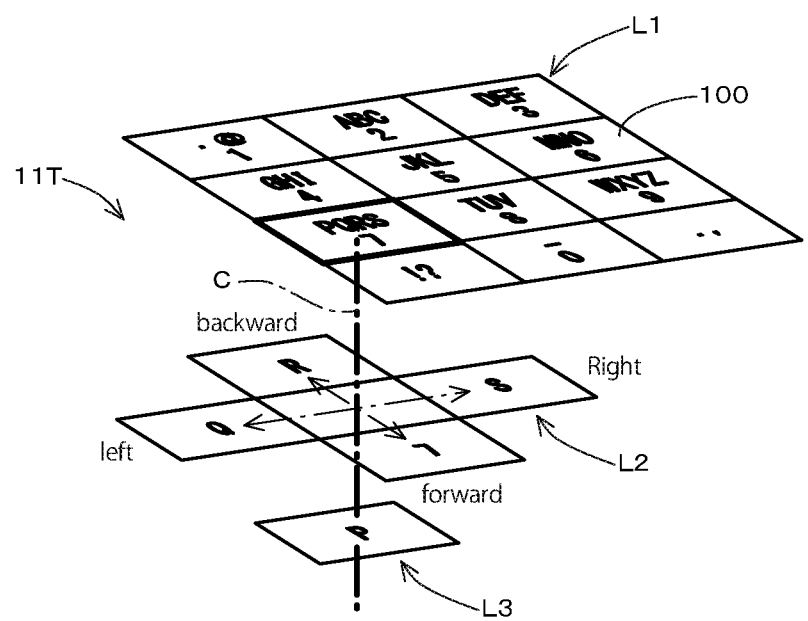
FIG. 8 is a view illustrating a configuration example of a virtual keyboard for input of alphanumeric characters.

The configuration of the virtual keyboard for input of English characters or numeric characters is not limited to those described above, and it is also possible to provide a virtual keyboard 11T having a three-layered structure as shown in FIG. 8, wherein a plurality of English characters and one numeric character are allocated each of 10 character keys 100; one of these characters is disposed on a third layer L3 as a representative character; and the remaining characters are arranged on the second layer L2 displaced longitudinally and horizontally with respect to the character key 100. Similarly, in a character key 100 having four or fewer allocated characters, a representative character (for example, "T") is disposed on the third layer L3; and the other keys (for example, "U," "V," "8") are respectively arranged in a left-side region, a front-side region, and a rear-side region on the second layer L2. According to this virtual keyboard 11T, a user can operate character input with a feeling close to that of the virtual keyboard for input of alphanumeric characters of conventional smartphones.

Figures 1, 9:
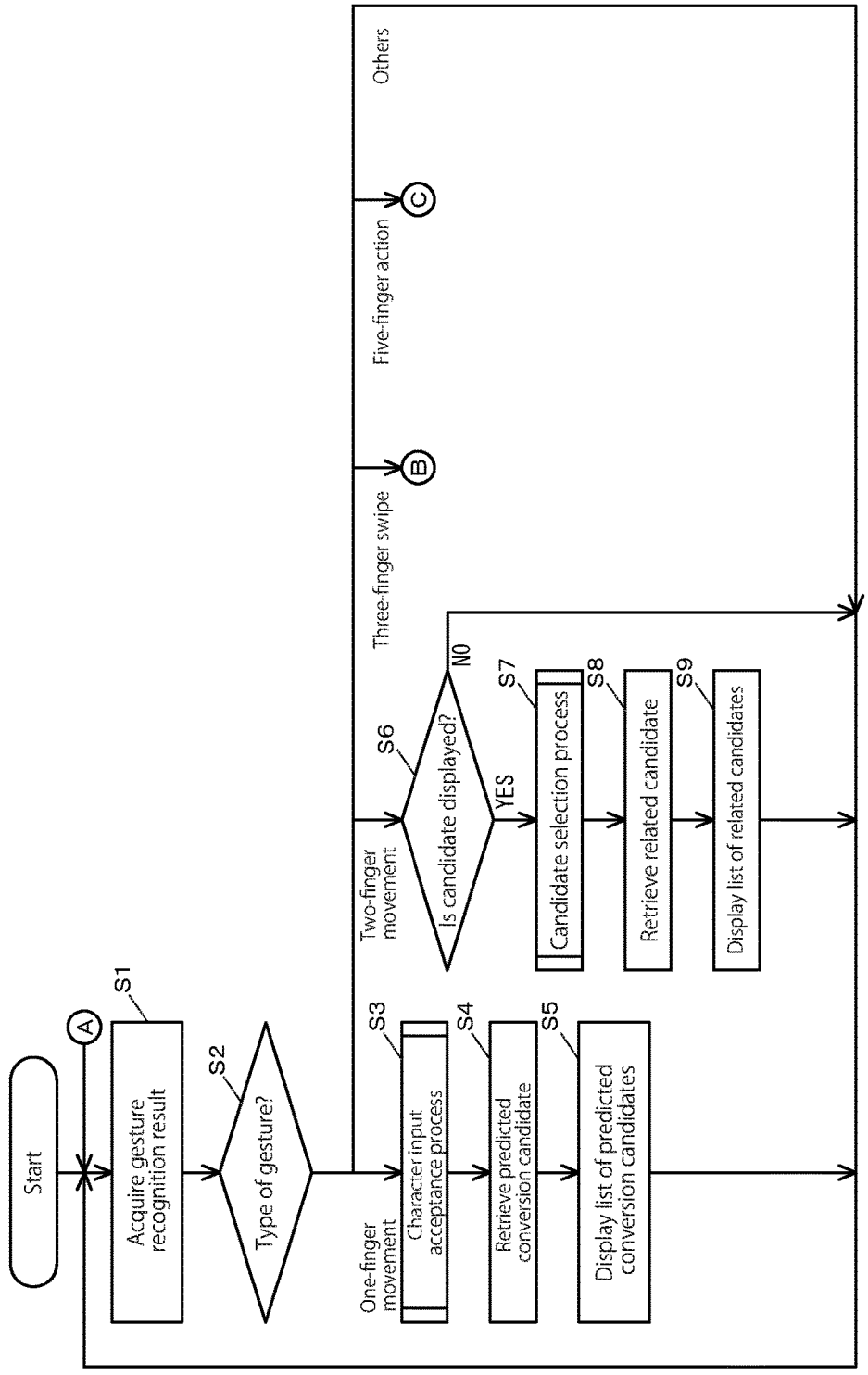
Figures 2, 9:
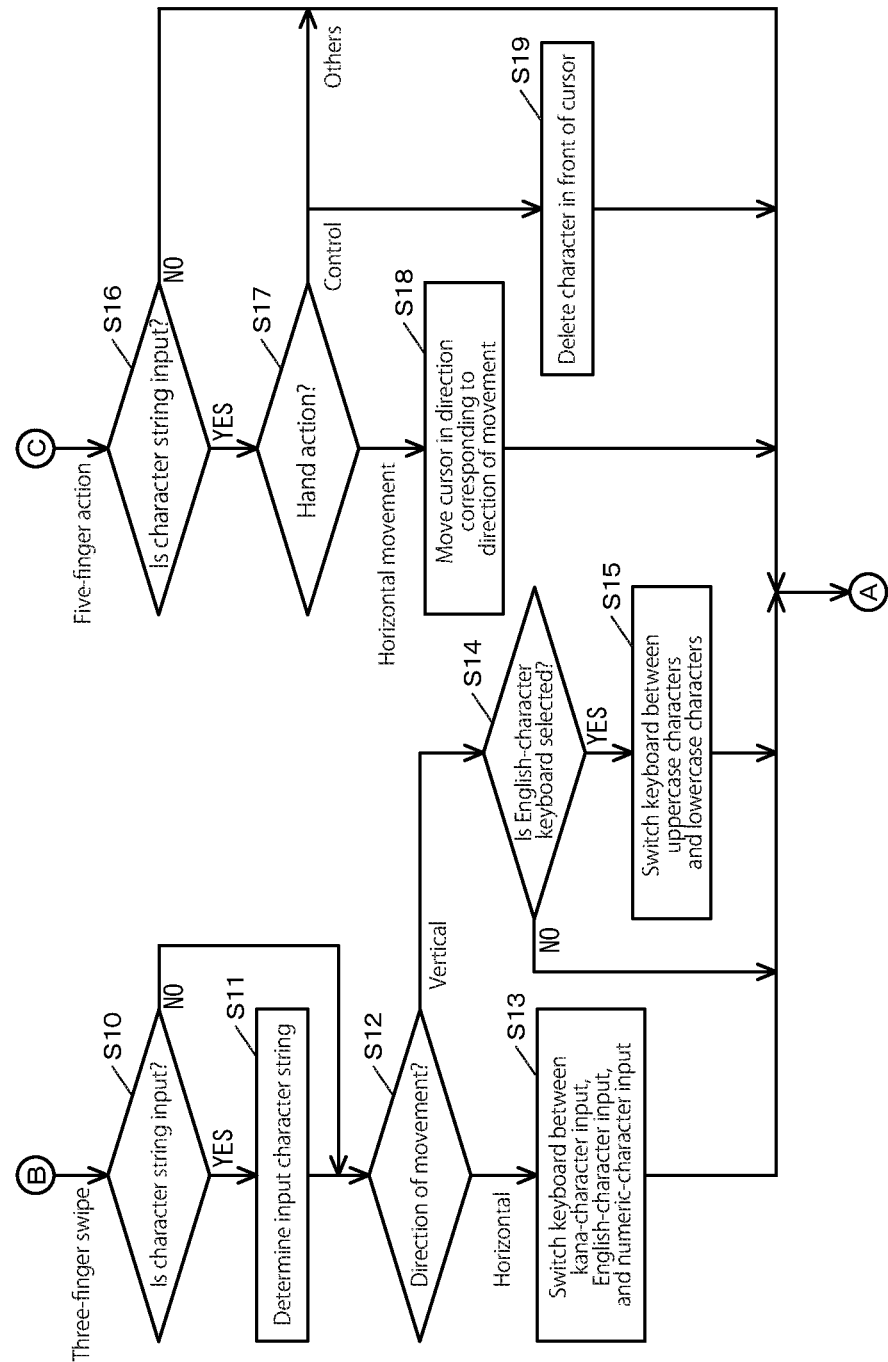

FIG. 9 (FIG. 9-1 and FIG. 9-2) shows a flow of process (hereinafter referred to as "main routine") performed by the character input device 1 in response to various types of gestures, as described above. According to this main routine, the gesture determination unit 10 acquires recognition results from the gesture recognition device 2; therefore, processes (steps S1, S2) for determining intention of the gesture are repeated on the basis of the determination results, and procedures responsive to the determination results per unit of time are carried out.

When a one-finger hand gesture movement is detected, the program goes to the character input acceptance process (step S3) performed by the virtual keyboard control unit 11. When an input character is determined by the process, the candidate retrieving unit 13 retrieves an estimated conversion candidate (step S4) and a candidate window display processing unit 18 receiving the retrieving results displays a candidate list of estimated conversion candidates (step S5).

When a two-finger hand gesture movement is detected, the program goes to the candidate selection process in step 7 under the condition that the candidate window 43 is displayed ("YES" in step 6). When an input character string is determined on the basis of the candidate selected by the candidate selection process, a connection candidate with respect to the determined character string is retrieved by the candidate retrieving unit 13 (step S8), and the candidate window display processing unit 18 receiving the retrieving results displays a candidate list of connection candidates (step S9) to thereby update the display on the candidate window 43.

When a three-finger swipe is detected, the virtual keyboard control unit 11 performs switchover of the virtual keyboard. However, when this swipe is carried out under the condition that an input character string is displayed in the input area 42, the program goes to the switchover of the virtual keyboard after the input character string in the input area 42 is determined (steps S10, S11).

If the swipe direction is either a leftward direction or a rightward direction, switchover is carried out between three types of virtual keyboards 11J, 11E, and 11N, as shown in FIG. 6(1) (step S13). Further, when either one of two types of virtual keyboards 11Ea and 11Eb, which are shown in FIG. 6(2) as the virtual keyboard 11E for English characters, is selected, if the above-described swipe is carried out in either the longitudinal or horizontal direction, a switchover to the other virtual keyboard for English characters is carried out (steps S14, S15).

When a five-finger hand gesture is detected, the process determines whether the hand moves to the right or left, or changes from an open state to a fist state under the condition that an input character string is displayed in the input area 42 (steps 16, 17). Here, if a movement in the right or left direction is detected, an input area display processing unit 17 performs the process of moving the cursor 40 in the input area 42 along the direction corresponding to the movement direction of the hand (step 18). Further, when the hand gesture made with five fingers is changed from an open state to a fist state, the input area display processing unit 17 performs the process of deleting a character ahead of the cursor 40 in the input area 42 (step S19).

The program returns to step S1 after the processes corresponding to each gesture are completed; regarding subsequent gestures, processes are performed in the same manner as described above. If a gesture made with a form different from the gestures described above is detected, such a gesture is disregarded as a gesture unrelated to character input, and the program returns to step S1.

Figures 1, 10:
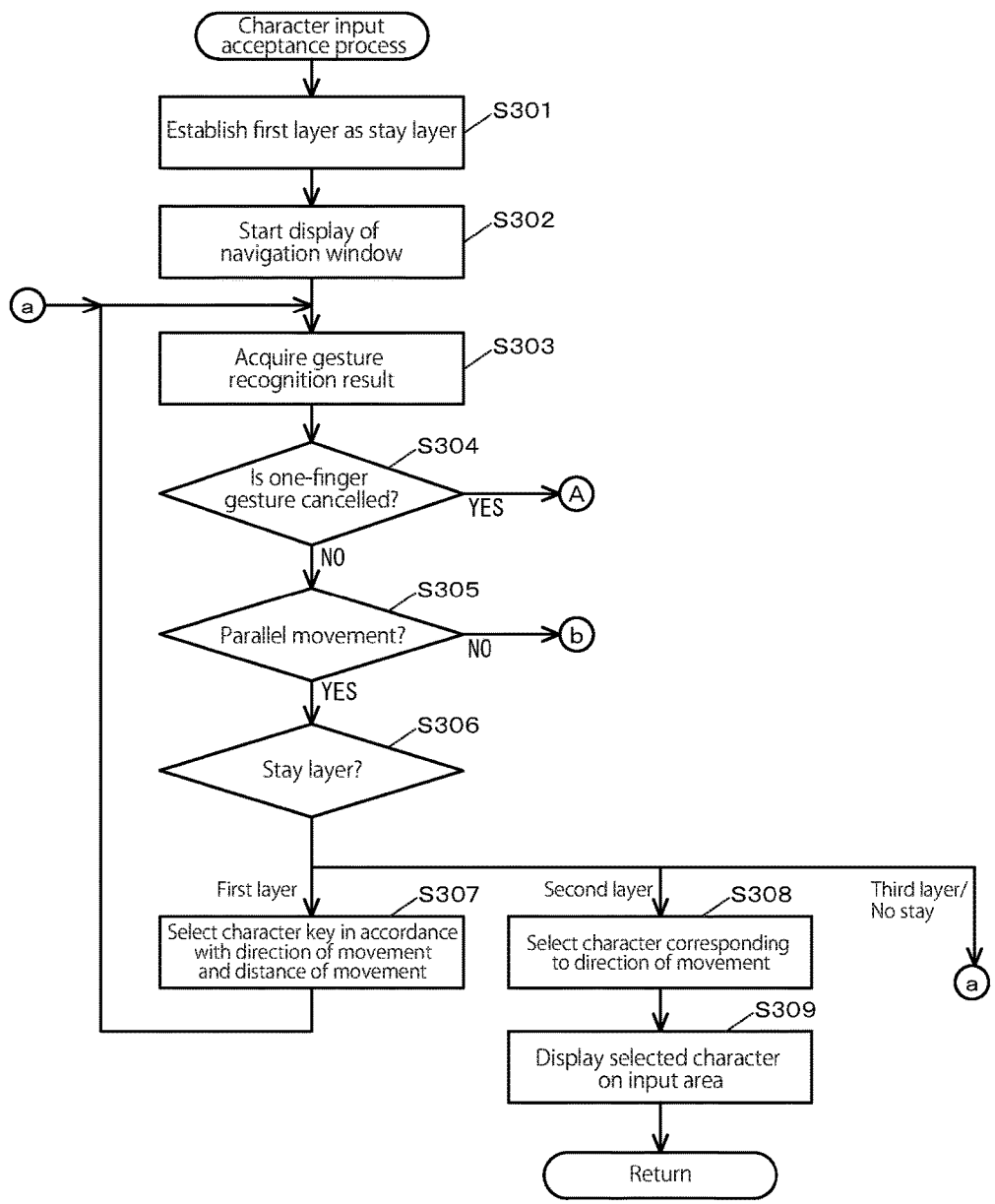
Figures 2, 10:
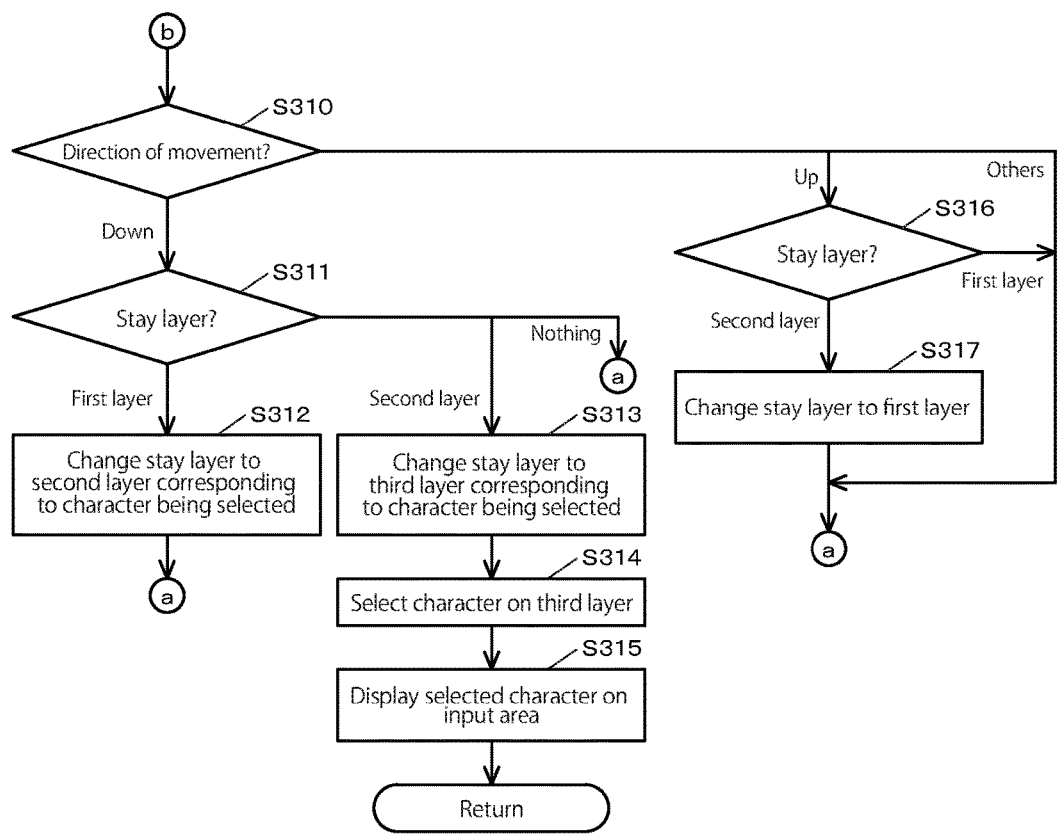

FIG. 10 (FIGS. 10-1 and 10-2) shows detailed steps when accepting character input using the three-structured virtual keyboard 11J in step S3 of a main routine. The character input acceptance process is started when a one-finger hand gesture is detected. Thereafter, while the gesture determination unit 10 performs gesture determination processes when necessary, the virtual keyboard control unit 11 progresses in the process in cooperation with the navigation window display processing unit 16 and the input character string assembling unit 12.

When the character input acceptance process is started, the virtual keyboard control unit 11 establishes a first layer L1 at a position corresponding to one finger making a gesture, and initializes the first layer L1 as a layer on which the finger is placed (hereinafter referred to as a "stay layer") (step S301). Upon this initialization, the navigation window display processing unit 16 starts display in the navigation window 41 (step S302). The display control subsequent to step S302 with respect to the navigation window 41 is supplementarily discussed in an example described later, with reference to FIG. 12.

Thereafter, the gesture determination unit 10 determines continuation of the one-finger hand gesture and movement direction of the hand (steps S303, S304, S305, and S310), and performs different processes depending on the determination results. Hereinafter, each process is discussed in correspondence to the gestures having a higher chance of being performed by a user.

When a user starts a parallel movement immediately after making a one-finger hand gesture, the program goes to step S307 upon determination of stay area as the first layer L1 after "NO" and "YES" are determined in steps S304 and S305, respectively, where a character key being selected is switched in response to the movement direction and the movement distance of a feature point group of a finger per unit time (step S307). Following this, a program loop including steps S303 through S307 is repeated while the one-finger parallel movement of the hand continues, and the selection position in the layout of the character keys 100 is changed in accordance with the parallel movement per unit time.

When the user switches the gesture from the parallel movement to a downward-movement action after completing selection of a character key 100, the movement direction is determined as "down" in step S310 after "NO" is determined in both steps S304 and S305. Further, after the stay layer is determined as the second layer L2 in step S311, the program goes to step S312, in which the stay layer is changed from the first layer L1 to the second layer L2.

The program returns to step S303 after change of the stay layer as described above. When the user gesture is again switched from the downward-movement action to a parallel movement, the program goes to step S308 upon determination of the stay layer as the second layer L2 in step S306 after "NO" and "YES" are determined in steps S304 and S305, respectively. In step S308, the virtual keyboard control unit 11 selects a character corresponding to the movement direction of the hand as an input character from among the characters arranged on the second layer L2. Further, upon this selection, the input area display processing unit 17 displays the selected character in the input area 42 (step S309). Thereafter, the program turns to the main routine, and proceeds to retrieval of an estimated conversion candidate (step S4).

In the case in which the user continues downward-movement action with the intention of selecting a representative character on the third layer, the stay layer is changed from the first layer L1 to the second layer L2 in response to the one-finger pushdown of the hand (step S312), and the downward-movement action is still detected in step S303 to which the program returned. Therefore, in this case, after determination in S304, S305, and S310, it is determined in step S311 that the stay layer is the second layer L2; upon this determination, the virtual keyboard control unit 11 performs steps S313 and S314, and the input area display processing unit 17 performs step S315.

In step S313, the stay layer is changed from the second layer L2 to the third layer L3; in step S314, a representative character disposed on the third layer L3 is selected as an input character. In step 315, the character selected in step S314 is displayed in the input area 42 (step S315). Thereafter, the program returns to the main routine, and proceeds to retrieval of the estimated conversion candidate (step S4).

After the one-finger downward-movement action by the hand is started, if the hand is raised without progressing toward the layout of characters, the stay layer is changed from the first layer L1 to the second layer L2 (step S312); thereafter, an upward-movement action is detected in step S303. Upon this detection, "NO" is determined in steps S304 and S305, after which it is determined in step S310 that the movement direction is upward and the program goes to step S316, after which it is determined in step S316 that the stay area is the second layer L2. The program goes to step S317 in response to these determinations, and the first layer L1 is established as the stay layer again, without selection of characters.

After a character is selected in step S308 and step S314, if the one-finger hand gesture is still continuously performed, the program goes through steps S1 and S2 in the main routine after steps S4 and S5 are performed, after which the character input acceptance process is started again. At this time as well, the stay layer is established as the first layer L1 (step S301), and the navigation window 41 showing the selection position on the first layer L1 is displayed; therefore, a character key 100 corresponding to a next input character can be selected by subsequently performing parallel movement of the hand with which the previous selection of an input character has been completed. Although the user may raise the finger with which selection has been made after completion of the previous selection of an input character, upon detection of the upward-movement action, the program goes through steps S302 through S304, S305, S310, and S316, and then returns to step S303 after the first layer L1 is initialized as the stay layer in step S301 immediately after resuming the character input acceptance process; therefore, the upward-movement action is disregarded, and a state in which the first layer L1 is established as the stay layer is maintained.

In the case in which the one-finger hand gesture is released while it stays on the first layer L1, or is released after the downward-movement action, without creating subsequent parallel movement or falling down to the third layer L3, "YES" is determined in step S304, after which the program returns to step S1 in the main routine.

Additionally, in the character input acceptance process using the keyboard 11E (11Ea, 11Eb) shown in FIGS. 6(1) and 6(2) for English-character input, the program goes through the same process as shown in FIG. 10, except that the processes relating to the third layer L3 are not performed. Meanwhile, in the character input acceptance process using the keyboard 11N composed of only the first layer L1 for numeric character input, the program goes through the same processes as steps S303 through S307 shown in FIG. 10; upon switchover of the gesture from parallel movement to downward-movement action, a character allocated to the character key 100 being selected is determined as an input character.

Figure 11:
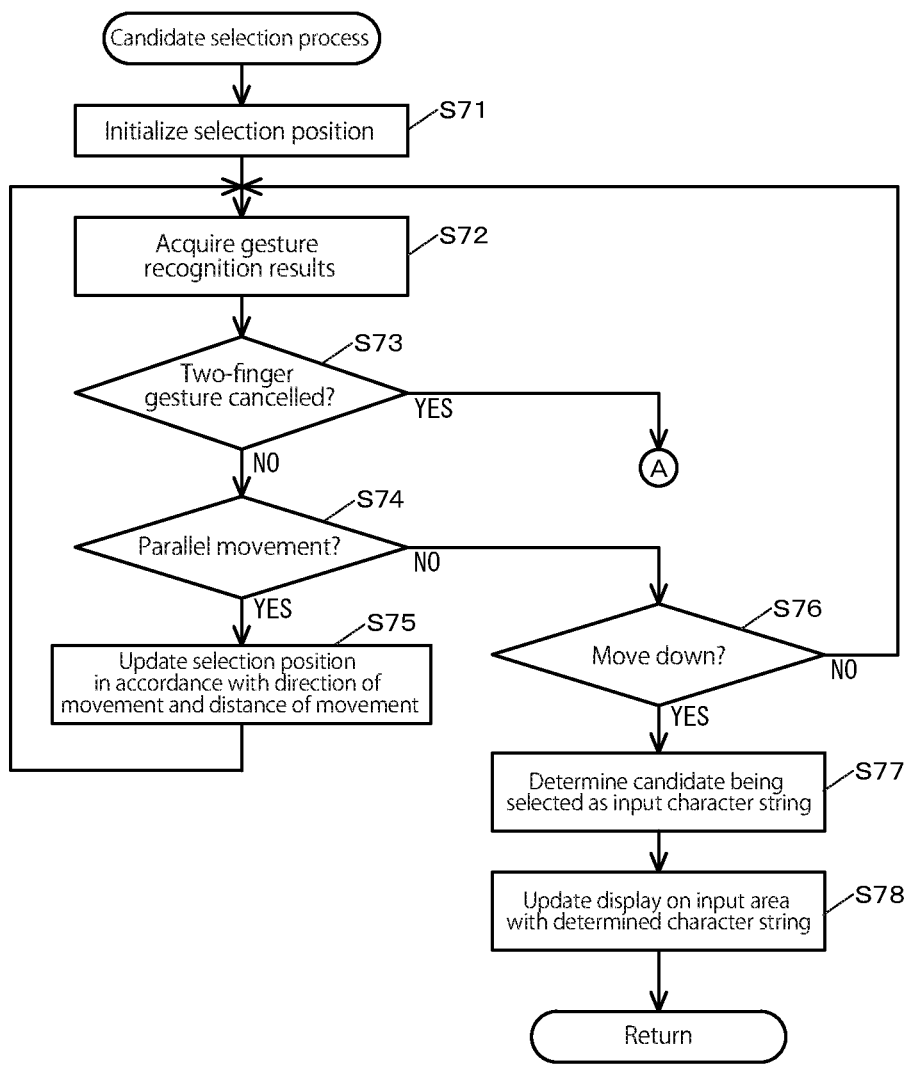
FIG. 11 is a flowchart illustrating the detailed steps of a candidate selection process in a main routine.

FIG. 11 shows detailed procedures in step 7 (candidate selection process) in the main routine. This process is performed when the two-finger hand gesture is started with respect to the display of a list of estimated conversion candidates in step S5, or the display of a list of connection candidates in step S9.

In first step S71, the candidate window display processing unit 18 initializes the display position of a leading candidate in the candidate window 43 as the selection position. Then, the gesture determination unit 10 determines the continuation of the two-finger hand gesture and the movement direction of a feature point group of the finger (steps S73, S74), and different procedures are carried out according to the determination results.

When the user continues parallel movement using the two-finger hand gesture, "NO" and "YES" are determined in steps S73 and S74, respectively, the program returns to step S75, and the candidate window display processing unit 18 changes the selection position according to the movement direction of the feature point group and the movement distance of the finger per unit time (step S75).

When the user completing selection of a candidate switches the two-finger hand gesture to a downward-movement action, "NO" is determined in steps S73 and S74, and "YES" is determined in step S76; afterward, the program goes to step S77, in which the candidate window display processing unit 18 determines the candidate being selected as an input character string.

The input area display processing unit 17, following the above determination, updates the display in the input area 42 with the determined character string (step S78). Specifically, if an input character string is determined from the list of estimated conversion candidates displayed in step S5, a kana character string (unsettled display) displayed in the input area 42 is replaced by the determined character string. On the other hand, if an input character string is determined from the list of connection candidates displayed in step S9, the determined character string is connected to the input character string displayed in the input area 42.

Upon completion of step S78, the program returns to the main routine, and the retrieval of a connection candidate with respect to the determined input character string is carried out (step S8).

Additionally, gestures aside from parallel movements and downward-movement actions are disregarded while the two-finger hand gesture continues. Further, the two-finger hand gesture is released prior to determination of selection of a candidate, "YES" is determined in step S73, and the program returns to step S1 in the main routine.

Figures 2, 12:
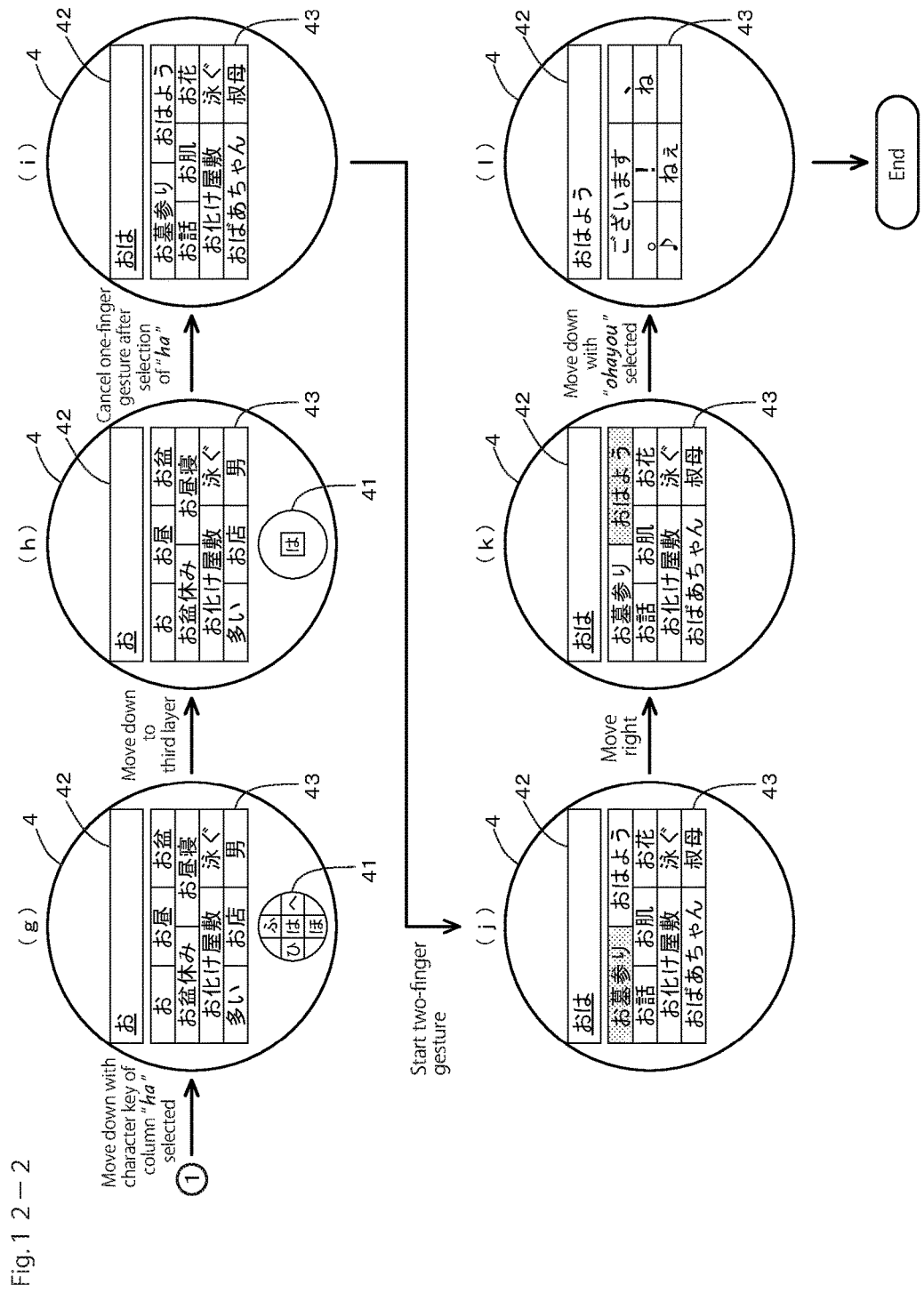

FIG. 12 (FIGS. 12-1 and 12-2) shows examples of displays developed in the display 4 in accordance with the one-finger hand gesture and the two-finger hand gesture. Hereinafter, display control is supplementarily discussed with respect to the navigation window 41 and the candidate window 43 with reference to this drawing.

FIG. 12(a) shows a display state of the display 4 immediately after one finger is detected in space, that is, when the character input acceptance process shown in FIG. 10 is started, wherein the navigation window 41 and the blank input area 42 are shown.

In the navigation window 41 shown in FIG. 12(a), the image of a character key 100 of the column "a" selected on the basis of initial data is disposed in the center. A user in this example moves the one-finger hand gesture down under a state in which the character key 100 of the column "a" is selected, and the downward-movement of the hand allows the stay layer to change from the first layer L1 to the second layer L2 (step S312 in FIG. 10). Upon this change, the display in the navigation window 41 is switched to an image showing a state in which each character arranged in the second layer L2 and the third layer L3 is viewed from overhead (FIG. 12(b)).

The user going through the navigation window 41 in FIG. 12(b) moves the one-finger hand gesture forward; following this movement, the display in the navigation window 41 is changed to a state in which a character "o" disposed in the movement direction is positioned in the center (FIG. 12(c)). Then, when the movement distance of the feature point group of a finger exceeds a threshold, steps S308 and S309 in FIG. 10 are performed, and "o" is displayed in the input area 42. Further, the program returns to the main routine in FIG. 9 and steps S4 and S5 are performed, to thereby display the candidate window 43 including a list of estimated conversion candidates with respect to "o."

According to the example shown in FIG. 12, the user still keeps the one-finger hand gesture after selection of "o," and the character input acceptance process is thus started again with the program going through steps S1 and S2 after performing steps S4 and S5. FIG. 12(d) is an example of a display when the program returned to the character input acceptance process, wherein the navigation window 41 is displayed along with the input area 42 including the determined "o" and the candidate window 43 including a list of estimated conversion candidates.

Thereafter, the selection position on the first layer L1 is changed in accordance with the parallel movement of the one-finger hand gesture (step S307 in FIG. 10), and an image within a prescribed range is displayed in the navigation window 41, including the character key being selected, which is displayed in the center of the image, along with other character keys near the center key (FIG. 12(e), (f)).

According to the example shown in FIG. 12, the user selecting a character key 100 of the column "ha" carries out a downward-movement action again. In accordance with this downward-movement action, when the stay layer is changed from the first layer L1 to the second layer L2 (step S32 in FIG. 10), the display in the navigation window 41 is updated to a display showing a state in which characters arranged on the second layer L2 and the third layer L3 are viewed from overhead (FIG. 12(g)). The user continues the downward-movement action after the update of display, and upon this downward-movement action, the stay layer is switched to the third layer L3 (step S313 in FIG. 10), and the navigation window 41 is changed to a state in which only the character "ha" disposed on the third layer is displayed (FIG. 12(h)).

Thereafter, the character "ha" is selected in step S314 in FIG. 10, and this character is added into the input area 42 subsequently in step S315; accordingly, the input character string is updated to "oha." Further, the program returns to the main routine, the retrieval of estimated conversion candidates based on the updated input character string is carried out (step S4 in FIG. 9), and the display in the candidate window 43 is updated subsequently in step S5 (FIG. 12(i)).

According to the example in FIG. 12, since the hand form is switched from a one-finger form to a two-finger form, the character input acceptance process is not resumed, and the navigation window 41 disappears from the screen shown in FIG. 12(i). Further, the candidate selection process (step S7, FIG. 11) is started with the program going through step S6 in the main routine, and a display field for a leading candidate in the candidate window 43 is displayed with a specific color in accordance with initialization of the selection position (step S71 in FIG. 11). The colored position moves in accordance with update of the selection position (step S75 in FIG. 11) associated with subsequent parallel movement (FIG. 12(k)).

According to the example in FIG. 12, the hand gesture made with two fingers is switched over to a downward-movement action under a state in which a second candidate "ohayou" ("good morning" in Japanese) is selected. Upon this switchover, steps S77 and S78 in FIG. 11 are performed to thereby update the display in the input area 41 to "ohayou." Further, steps S8 and S9 are performed in the main routine to which the program returns after determination, and thus the display in the candidate window is updated to display a list of connection candidates with respect to "ohayou" (FIG. 12(1)).

As discussed above, there are detailed descriptions concerning embodiments for accepting gestures for character input using the virtual keyboard 11J having a three-layered structure made up of the virtual plane (first layer L1) on which a plurality of character keys 100 is arranged, with each character key 100 having a plurality of characters allocated thereto, and the second layer L2 and the third layer L3 provided for each character key 100. In these descriptions, although there are no descriptions concerning gestures performed to directly determine kana characters and kana character strings selected by the character input acceptance process, a certain gesture having a form not included in the above descriptions, for example, a one-finger hand gesture in which a circle is drawn following selection of an input character, may be applied to this determination process.

In the embodiment discussed above, upon detection of a one-finger hand gesture, a virtual plane (first layer) including the position of the finger and the layout of character keys 100 is established along the surface of the display 4;

however, the embodiment is not limited to this configuration, and the character keys 100 may be arranged upon start of the parallel movement of the one-finger hand gesture substantially parallel to the surface of the display 4 with the virtual plane along the movement direction as the first layer L1.

Additionally, the configuration of the virtual keyboard is not limited to the embodiment described above, and numerous different variations may be considered. For example, a virtual keyboard having a two-layered structure may be established by disposing a representative character of each character key 100 for kana character input at the center of the second layer L2 (position intersecting with the virtual axis C). If this virtual keyboard is used, after a parallel movement for selecting a character key 100 is switched to a downward-movement action, upon switchover to a parallel movement again, a character disposed in the movement direction (excluding the representative character) is selected, while the representative character can be selected when action is suspended for a prescribed period of time without any parallel movement following the downward-movement action. Alternatively, characters excluding the central representative character may be selected as an input character by performing a gesture that moves the finger on the first layer L1 directly in a direction (obliquely downward) in which an intended character is disposed.

A layer on which characters are arranged is established not under the first layer L1, but over the first layer L1, and a mode for selecting a character key 100 may be shifted to a mode for selecting a character when a hand gesture is switched from a parallel movement to an upward-movement action. Further, a layer on which characters having a prescribed character type (for example, hiragana characters) are arranged is established under the first layer L1, and a layer on which characters having another character type (for example, katakana characters) are arranged is established over the first layer L1, wherein when the movement direction of the hand subjected to a parallel movement for selection of a character key 100 is switched to either an upward or downward direction, the character type of a character to be input may be switched.

The character layout is not limited to the layout parallel to the first layer L1; it is possible to establish, for example, a virtual keyboard having a structure in which a plurality of characters allocated to the same character key are disposed at individually different height positions along the virtual axis C passing through the character keys 100. When this virtual keyboard is used, the selection position on the first layer L1 is changed according to a parallel movement; when the gesture is switched from the parallel movement to a downward-movement action, a shift to a character selection operation is determined, and it is possible to switch character selection in accordance with a change of movement distance thereafter while a navigation display showing a character being selected is carried out on the display 4. Additionally, it is possible to ensure the accurate selection of input characters by switching selection of a character in reverse order upon switchover from a downward-movement action to an upward-movement action, and by determining a character corresponding to a stop position of movement as an input character.

Additionally, except for the selection of character keys 100 and selection of characters, it is possible to, when necessary, set gesture forms easily accepted by a user as gesture forms relating to the processes (selection of a candidate, switchover of a virtual keyboard, cursor movement, deletion of an input character, etc.); the gestures are not limited to the above-mentioned embodiments. It is also possible to carry out the same character input acceptance process as the above-mentioned embodiments with a gesture not limited to a hand movement, but, for example, by performing a head- or line-of-sight-moving gesture.

The character input method according to the present invention including various types of embodiments is not limited to a wearable terminal, and may be introduced into other information-processing devices, such as smartphones. Further, it is also possible to accept Character input in accordance with gestures performed in space at the front of the display based on the method for character input according to one or more embodiments of the present invention, with display areas such as the navigation window 41, the input area 42, and the candidate window 43 provided on a portion of a large-sized display.

DESCRIPTION OF THE REFERENCE SYMBOLS

S Information-processing device
1 Character input device
2 Gesture recognition device
3 Application
4 Display
10 Gesture determination unit
11 Virtual keyboard control unit
12 Input character string assembling unit
13 Candidate retrieving unit
14 Input character string determination unit
15 Display control unit
16 Navigation window display processing unit
17 Input area display processing unit
18 Candidate window display processing unit
40 Cursor
41 Navigation window
42 Input area
43 Candidate window
11J, 11E, 11E1, 11E2, 11T Multilayered virtual keyboard
L1 First layer
L2 Second layer
L3 Third layer
C Virtual axis
100 Character key
101 Key layout definition table
102 Dictionary database

What is claimed is:

1. A character input method that detects at least one gesture having at least one predetermined form as an operation for character input by means of a gesture recognition device that recognizes the at least one gesture performed in space, and determining a character to be input on the basis of the detection results in a computer that performs a prescribed process in response to input of characters, wherein the computer registers first definition information for layout of a plurality of character keys on a first virtual plane, each having a plurality of characters allocated thereto, and second definition information for layout of each character allocated to each of the arranged character keys outside the first virtual plane at individually different positions relative to a virtual axis passing through the character key, wherein the computer performs:
step 1 of establishing a layout of the plurality of character keys by applying the first definition information to the first virtual plane including a detection position of a first gesture that satisfies predetermined conditions in response to detection of the first gesture;

step 2 of moving a selection position with respect to the layout of character keys in accordance with a second gesture under the condition that the second gesture moving along the first virtual plane on which the layout of character keys is established is detected; and step 3 of selecting a character disposed at a moving destination of the second gesture as a character to be input in response to detection of a third gesture moving toward any of the plurality of characters arranged on the basis of the second definition information with respect to the character key being selected after a movement direction of the second gesture detected is switched from a first direction along the second virtual plane on which the character keys are established to a second direction away from the virtual plane by the third gesture under the condition that a prescribed character key in the layout is selected, wherein step 2 comprises a process of displaying an image that is a part of an image showing the layout of the character keys with a character key selected along a movement direction of the second gesture as a center, and wherein step 3 comprises a process of showing an image representing the positional relationship of each character allocated to the selected character key in place of the display in step 2 on the basis of the second definition information, and wherein the computer performs step 4 of extracting estimated conversion candidates or connection candidates adapting to the input character and displaying a list of the extracted candidates on the display in response to selection of an input character in step 3, while performing step 5 of updating a display indicating a selection position in the list under a state in which the list is displayed, in accordance with a fourth gesture in response to detection of a gesture having a form different from the first through third gestures, moving along the virtual plane on which the character keys are arranged.

2. The character input method according to claim 1, wherein the second definition information implies distribution of the plurality of characters allocated to the same character key on a second virtual plane along the second virtual plane.

3. The character input method according to claim 1, wherein a maximum of five keys is allocated to each character key arranged on the first virtual plane, and wherein the second definition information implies distributing each character except for one character among the plurality of characters allocated to the same character key in a range not including a position intersecting with the virtual axis on the second virtual plane along the second virtual plane, while disposing the one remaining character at the position intersecting with the virtual axis on a third virtual plane with the second virtual plane interposed between the first virtual plane and the third virtual plane.

4. The character input method according to claim 1, wherein the gesture recognition device recognizes gestures that move a hand, wherein the computer starts to perform step 2 with a position of any character key in the layout of character keys established in step 1 as an initial selection position, after performing step 1 in response to detection of a one-finger hand gesture on the basis of the recognition results of the gesture recognition device, and wherein step 2 is shifted to step 3 when it is detected that the one-finger hand gesture begins to move in a direction along the virtual axis that passes through the character key being selected.

5. The character input method according to claim 1, wherein the first definition information and the second definition information are registered in the computer for a plurality of types of virtual keyboards having different types of characters allocated to each character key, wherein a virtual keyboard to be activated is switched in response to detection of a gesture having a prescribed form different from the gesture relating to each of steps 1 through 3, and wherein the computer performs each of steps 1 through 3 using the first definition information and the second definition information corresponding to the activated virtual keyboard.

6. The character input method according to claim 1, wherein a display region for input character string equipped with a cursor indicating an input position is provided on the display connected to the computer, and wherein when an input character is selected in step 2, the selected input character is inserted ahead of the cursor in the display region for input character string.

7. The character input method according to claim 6, wherein a position of the cursor is moved in response to detection of a first gesture having a form different from the gesture relating to each of steps 1 through 3, and wherein a character ahead of the cursor is deleted in response to detection of a second gesture having a form different from the gesture relating to each of steps 1 through 3 and the first gesture under a state in which an input character string having a prescribed length is displayed in the display region for input character string.

8. An information-processing device comprising: a computer and a plurality of software devices stored in a medium to be executed by the computer, the plurality of devices comprising: a gesture recognition device that recognizes at least one gesture performed in space; a character input device that detects gestures of predetermined form as an operation for character input by means of the gesture recognition device, and determining a character to be input on the basis of the detection results; and a display, wherein the character input device comprises:

a definition information storage that registers first definition information for layout of a plurality of character keys on a first virtual plane, each having a plurality of characters allocated thereto; and second definition information for layout of each character allocated to each of the arranged character keys outside the first virtual plane at individually different positions relative to a virtual axis passing through the character key;

a character key layout generator that establishes a layout of the plurality of character keys by applying the first definition information to the first virtual plane including a detection position of a first gesture that satisfies predetermined conditions in response to detection of the first gesture;

a character key selector that moves a selection position with respect to the layout of character keys in accordance with a second gesture under the condition that the second gesture moving along the first virtual plane on which the layout of character keys is established is detected;

an input character selector that selects a character disposed at a moving destination of the second gesture as a character to be input in response to detection of a third gesture moving toward any of the plurality of characters arranged on the basis of the second definition information with respect to the character key being selected after a movement direction of the second gesture detected is switched from a first direction along the first virtual plane on which the character keys are established to a second direction away from the first virtual plane by the third gesture under the condition that a prescribed character key in the layout is selected;

a display controller that displays an image showing a character key or a character that can be selected by the third gesture being detected in conjunction with operations of the character key selector and the input character selector;

a candidate extractor that extracts estimated conversion candidates or connection candidates adapting to an input character in response to selection of the input character using the input character selector, wherein the display controller displays an image of a region that is a part of an image showing the layout of the character keys with a character key selected along a movement direction of the second gesture as a center, and shows an image representing the positional relationship of each character allocated to the selected character key on the display in response to start of the process of the input character selector, in place of the display of character keys, on the basis of the second definition information, and wherein the display controller displays a list of the estimated conversion candidates or connection candidates extracted by the candidate extractor on the display while updating a selection position of candidates in the list under a state in which the list is displayed, in accordance with a fourth gesture in response to detection of a gesture having a form different from a gesture relating to the process of the character key selector, moving along the virtual plane on which the character keys are arranged.

9. A non-transitory computer-readable recording medium that records a computer program to cause a character input device to perform operations comprising:

registering first definition information for layout of a plurality of character keys on a first virtual plane, each having a plurality of characters allocated thereto, and second definition information for layout of each character allocated to each of the arranged character keys outside the virtual plane at individually different positions relative to a virtual axis passing through the character key;

establishing a layout of the plurality of character keys by applying the first definition information to the first virtual plane including a detection position of a first gesture that satisfies predetermined conditions in response to detection of the first gesture;

moving a selection position with respect to the layout of character keys in accordance with movement of the second gesture under the condition that the second gesture moving along the first virtual plane on which the layout of character keys is established is detected;

selecting a character disposed at a moving destination of the second gesture as a character to be input in response to detection of a third gesture moving toward any of the plurality of characters arranged on the basis of the second definition information with respect to the character key being selected after a movement direction of the second gesture detected is switched from a first direction along the virtual plane on which the character keys are established to a second direction away from the first virtual plane under the condition by the third gesture that a prescribed character key in the layout is selected;

displaying an image showing a character key or a character that can be selected by the gesture being detected in conjunction with operations of the character key selection unit and the input character selection unit, and extracting estimated conversion candidates or connection candidates adapting to an input character in response to selection of the input character using the input character selection unit, displaying an image of a region that is a part of an image showing the layout of the character keys with a character key selected along a movement direction of the gesture as a center, and shows an image representing the positional relationship of each character allocated to the selected character key on a display in response to start of the process of the input character selector, in place of the display of character keys, on the basis of the second definition information, and displaying a list of the estimated conversion candidates or connection candidates extracted by the candidate extractor on the display while updating a selection position of candidates in the list under a state in which the list is displayed, in accordance with a gesture in response to detection of a gesture having a form different from a gesture relating to the process of the character key selector, moving along the virtual plane on which the character keys are arranged.

* * * * *